US010440019B2

United States Patent
Deutschmann et al.

(10) Patent No.: US 10,440,019 B2
(45) Date of Patent: *Oct. 8, 2019

(54) METHOD, COMPUTER PROGRAM, AND SYSTEM FOR IDENTIFYING MULTIPLE USERS BASED ON THEIR BEHAVIOR

(71) Applicant: Behaviometrics AB, Lulea (SE)

(72) Inventors: Ingo Deutschmann, Merseburg (DE); Neil Costigan, Lulea (SE); Tony Libell, Lulea (SE); Peder Nordström, Lulea (SE)

(73) Assignee: BEHAVIOMETRICS AG, Lulea (SE)

( * ) Notice: Subject to any disclaimer, the term of this patent is extended or adjusted under 35 U.S.C. 154(b) by 26 days.

This patent is subject to a terminal disclaimer.

(21) Appl. No.: 15/581,588

(22) Filed: Apr. 28, 2017

(65) Prior Publication Data

US 2017/0230363 A1    Aug. 10, 2017

Related U.S. Application Data

(60) Continuation-in-part of application No. 15/343,616, filed on Nov. 4, 2016, now Pat. No. 10,068,076, which is a division of application No. 14/705,478, filed on May 6, 2015, now Pat. No. 9,529,987.

(60) Provisional application No. 61/990,727, filed on May 9, 2014.

(51) Int. Cl.
*H04L 29/06* (2006.01)
*H04W 12/06* (2009.01)
*H04W 12/00* (2009.01)

(52) U.S. Cl.
CPC ...... *H04L 63/0861* (2013.01); *H04L 63/0838* (2013.01); *H04W 12/06* (2013.01); *H04W 12/00508* (2019.01)

(58) Field of Classification Search
CPC ........ G06F 21/31; G06F 21/316; G06F 21/32; G06F 2203/04105; G06F 3/04883; H04L 29/06; H04L 29/08; H04L 63/08; H04L 63/083; H04L 63/10; H04L 63/102; H04L 67/22; H04L 67/30; H04L 67/306; G06N 5/022
See application file for complete search history.

(56) References Cited

U.S. PATENT DOCUMENTS

| | | | | |
|---|---|---|---|---|
| 7,908,216 | B1 * | 3/2011 | Davis | G06Q 20/02 705/41 |
| 9,298,912 | B2 * | 3/2016 | Costigan | G06F 21/55 |
| 9,565,189 | B1 * | 2/2017 | Gill | H04L 63/0876 |
| 2003/0002719 | A1 * | 1/2003 | Hamid | G06K 9/0002 382/124 |
| 2003/0021451 | A1 * | 1/2003 | Lee | G06K 9/00026 382/124 |
| 2003/0088645 | A1 * | 5/2003 | Ferraro | G06Q 10/10 709/218 |
| 2003/0123714 | A1 * | 7/2003 | O'Gorman | G06K 9/00026 382/124 |
| 2003/0179912 | A1 * | 9/2003 | Murase | G06K 9/00154 382/119 |

(Continued)

*Primary Examiner* — Joseph P Hirl
*Assistant Examiner* — Sayed Aresh Beheshti Shirazi
(74) *Attorney, Agent, or Firm* — Michael J. Feigin, Esq.; Feigin & Fridman, LLC

(57) ABSTRACT

A computer-implemented method, computer device and computer system for detecting multiple users based on a biometric user profile and/or a behavioral user profile.

20 Claims, 6 Drawing Sheets

(56) References Cited

U.S. PATENT DOCUMENTS

| | | | |
|---|---|---|---|
| 2004/0131237 A1* | 7/2004 | Machida | G06K 9/00026 382/124 |
| 2005/0022034 A1* | 1/2005 | Chaudhari | G06F 21/32 726/19 |
| 2005/0238207 A1* | 10/2005 | Tavares | G06K 9/00885 382/115 |
| 2007/0203836 A1* | 8/2007 | Dodin | G06Q 20/02 705/44 |
| 2008/0091453 A1* | 4/2008 | Meehan | G06Q 20/341 705/317 |
| 2008/0129704 A1* | 6/2008 | Pryor | G06F 3/011 345/173 |
| 2009/0025071 A1* | 1/2009 | Mumm | G06F 21/32 726/7 |
| 2009/0278792 A1* | 11/2009 | Toebes | G06F 21/83 345/173 |
| 2009/0292927 A1* | 11/2009 | Wenzel | G06F 21/41 713/185 |
| 2009/0300774 A1* | 12/2009 | Makkinejad | G06F 21/629 726/27 |
| 2010/0115610 A1* | 5/2010 | Tredoux | G06F 21/316 726/19 |
| 2010/0144440 A1* | 6/2010 | Arrasvuori | A63F 13/12 463/42 |
| 2010/0272609 A1* | 10/2010 | Haas | G01N 21/8483 422/82.05 |
| 2010/0306825 A1* | 12/2010 | Spivack | H04W 4/029 726/4 |
| 2011/0126024 A1* | 5/2011 | Beatson | G06F 21/32 713/186 |
| 2011/0282972 A1* | 11/2011 | Rosen | G06Q 30/02 709/219 |
| 2011/0304531 A1* | 12/2011 | Brooks | G06F 1/1626 345/156 |
| 2012/0066749 A1* | 3/2012 | Taugbol | G06F 21/40 726/6 |
| 2012/0246737 A1* | 9/2012 | Paxton | G06F 21/316 726/27 |
| 2012/0266220 A1* | 10/2012 | Brudnicki | G06F 21/34 726/6 |
| 2013/0047223 A1* | 2/2013 | Headley | H04L 63/0838 726/5 |
| 2013/0076650 A1* | 3/2013 | Vik | G06F 3/0418 345/173 |
| 2013/0174261 A1* | 7/2013 | Wilkerson | H04L 67/125 726/25 |
| 2013/0282637 A1* | 10/2013 | Costigan | G06N 5/022 706/46 |
| 2013/0288647 A1* | 10/2013 | Turgeman | H04W 12/06 455/411 |
| 2014/0247251 A1* | 9/2014 | Zhang | G06F 3/0488 345/178 |
| 2014/0297528 A1* | 10/2014 | Agrawal | G06Q 20/40145 705/44 |
| 2016/0197918 A1* | 7/2016 | Turgeman | G06F 21/31 726/4 |
| 2017/0163682 A1* | 6/2017 | Yu | H04L 63/1491 |
| 2017/0230363 A1* | 8/2017 | Deutschmann | H04L 63/0861 |

* cited by examiner

METHOD, COMPUTER PROGRAM, AND SYSTEM FOR IDENTIFYING MULTIPLE USERS BASED ON THEIR BEHAVIOR

BACKGROUND OF THE INVENTION

1. Field of the Invention

The principles of the present disclosure relate generally to behavioral authentication systems, a behavioral authentication method, and a behavioral authentication software program. More particularly the disclosed invention relates to a system, a method, and a software program for identifying multiple users based on their behavior.

2. Description of the Related Art

Typically a user requesting access to a service, such as an electronic transaction, is asked to enter his Log-In and password to authenticate the current user as the credential or legal one.

Related to a system for electronic transaction authorization at a fixed money machine, U.S. Patent Application Publication 2008/0091453 discloses a method of using behavioral biometric algorithms of keyboard dynamics of a device that distinguish behavior of one human from other human behavior when a user is employing a system input. In this disclosure, the credentialed user is the only acceptable user for getting access to the money machine.

U.S. Patent Application Publication US2003/0179912 discloses a signature authentication system, wherein each element of the shape of handwriting, writing speed, writing acceleration, and writing pressure is computed. Because one's own signature is highly personal it is assumed that there is always only one user related to a signature.

In some cases, people other than the main credentialed user, such as a spouse, family members, and colleagues, may, from time to time, share electronic devices with the user, such as smart-phones, tablets and desktop computers. Such sharing is typically in a limited manner and usually for obtaining access to less private services, like internet and email accounts.

Desktop computers, mobile devices, and tablet computers typically have no built-in security mechanisms for user authentication with web services and applications, besides a traditional Personal Identification Number (PIN) or interaction with additional devices, like smart cards or One-Time Password (OTP) tokens. In order for authentication of users to be unobtrusive and not annoying or disrupting, a behavioral authentication which occurs in the background and is transparent to the user is often seen as a favorite method.

Several patent applications and issued patents disclose use of biometric methods to identify users on mobile devices. U.S. Patent Publication No. 2010/0225443, describes a system for user authentication using touch sensitive elements and/or using a signature of the user. U.S. Patent Publication No. 2011/0126024, describes a method and system for combining a PIN and a biometric sample. U.S. Pat. No. 8,443,443, describes a behavioral system for authenticating users, based on keyboard, mouse and Graphical User Interface (GUI) actions.

In behavioral systems, there is typically an enrollment phase and an authentication phase. In the enrollment phase, the behavior of the user is gathered on the client computer, and transferred to the behaviometric authentication system, which generates a behavioral profile and stores it in a database.

In the authentication phase, the behavior of the user is gathered on the client computer, and is sent to the behavioral authentication system. The behavioral authentication system compares the received data with the associated behavioral profile. If the behavior of the user is similar to the behavior stored in the associated behavioral profile, the user is granted access to the protected application or the protected resource. The problem with this solution is that there is no possibility of adding multiple users to the same profile, as different users show different behaviors.

In many environments, such as banking applications or access control systems for sensitive information, multiple users may access the protected information or application with the same username or user credentials, such as a customer number and a user specific PIN. For example, this may occur when using "spouse accounts". In banking applications the users may be the owner of the account and his spouse, or multiple people in a company, where several people are allowed to manage a banking account while using the same customer number.

As behavioral methods are built to discriminate users based on their behavior, they cope poorly with authenticating users for shared accounts, as each of the user's authorized to access the account has his or her own unique behavior profile. Consequently, a behavior profile must be built for each authorized user, while being associated with a single customer number or identifier. As such, the behavioral profile for one customer number must consist of the stored behavior of several people. This is not possible with the above described solutions. Thus, needed in the art are more effective systems and methods for using behavioral information for authenticating several users using the same authentication information.

Accordingly, it is an object of the present invention to provide a device, a computer program and a method for identifying multiple users based on their behavior. In the case of identifying multiple users, it is an additional object of the disclosed invention to authenticate these multiple users, for access to protected information using the user credential information. Such authentication is based on monitoring and gathering behavior information, so that a behavioral user profile and a behavioral user sample are formed and stored for multiple users, in association with the authentication information, so as to determine security clearance during future uses of said protected information, as described in the U.S. patent application Ser. No. 14/705,478, which is incorporated hereinabove by reference.

SUMMARY OF THE INVENTION

The problems introduced above are solved by the present technology, which describes a method, a computer program and a computer-system executing an algorithm for identifying multiple users based on their behavior.

In accordance with an embodiment of the present invention, there is provided a method for granting access to an unauthorized user, the including the steps of:

using at least one of a biometric or behavioral input device, generating a biometric or behavioral user profile associated with a first user to be authenticated;

storing the generated biometric or behavioral user profile in a storage device;

receiving, via the biometric or behavioral input device, authentication data from an unknown user, wherein it is unknown if the unknown user is the first user or a second user;

comparing the authentication data to the biometric or behavioral user profile associated with the first user and determining if the unknown user is the first user or the second user; and transmitting to the unknown user, via a wired or wireless packet-switched network an indication that access to protected information associated with the first user has been granted.

In some embodiments, when the unknown user is determined to be the second user, providing to the second user simulated information similar to the protected information associated with the first user.

In some embodiments, the method further includes a step of, after providing at least some the simulated information similar to at least some of the protected information associated with the first user, sending a secondary out of band authentication request to the unknown user or to the second user via a different communication channel, the different communication channel including at least one of e-mail, text message, a fingerprint authentication, or audio phone call.

In some embodiments, the secondary out of band authentication request includes at least one of:

requesting the second user or the unknown user to transmit a one time password (OTP) token to a second device associated with the first user;

asking the second user at least one security question previously registered for deeper authentication cases by the first user;

asking additional private information about the first user, such as additional private information obtained by data mining.

In some embodiments, the biometric or behavioral user profile includes at least one of a fingerprint, a facial image, and a voice recording, and at least one of:

characteristics of tactile interaction with a touchpad;

orientation of a device including the biometric or behavioral input device, during use thereof by the first user, as sensed by at least one of a gyroscope, a magnetometer and an accelerometer;

characteristics of tactile interaction with a fingerprint scanner;

at least one keystroke pattern;

at least one sequence of application use;

characteristics of times of use;

characteristics of locations of use; and characteristics of network connectivity during use.

In some embodiments, the biometric or behavioral input device is a fingerprint reader which is used to generate the biometric or behavioral user profile by:

acquiring from the fingerprint reader a full image of a fingerprint of the first user;

obtaining from the fingerprint reader at least one other, at least partial, image of a fingerprint of the first user;

using the full image and the at least one other image, determining at least one of:

a direction in which a finger of the first user was swiped over the fingerprint reader in a fingerprint swipe;

a center of gravity of the fingerprint swipe;

a speed of the fingerprint swipe;

a position of the fingerprint swipe relative to a fingerprint sensor of the fingerprint reader; and a pressure applied by the finger of the first user when swiping over the fingerprint reader; and using the full image, the at least one other image, and at least one of the direction, the center of gravity, the position, the speed, and the pressure, generating a fingerprint swiping profile of the first user in the biometric or behavioral user profile.

In some embodiments, the fingerprint reader includes a touchpad, and the determining additionally includes determining at least one of a pattern of finger swiping on the touchpad, at least one gesture drawn on the touchpad, electrical currents drawn by the fingerprint reader, and characteristics of user tapping on the touchpad and/or the biometric or behavioral user profile additionally includes at least two of:

an angular orientation of a device including the biometric or behavioral input device during use thereof by the first user;

a location of use of the device;

at least one network to which the device is connected during use thereof by the first user;

at least one keystroke pattern;

at least one sequence of applications used by the first user on the device;

and characteristics of times of use of the device by the user.

In some embodiments, when the unknown user is determined to be the second user, the method further including, as a direct result of that the unknown user is determined to be the second user, sending a fraud alert to the first user via a wired or wireless packet-switched communication channel.

In some embodiments, the method further includes:

capturing biometric or behavioral data for all users using the biometric or behavioral input device;

storing the captured biometric or behavioral data on the storage device; and upon receipt of new data from another user, comparing the new data with all the stored captured biometric and behavioral data and determining whether the another user is the same as the second user, wherein the determining is carried out after one of adjusting for noise in the stored captured biometric and behavioral data, and adjusting for timing jitters of less than 1 millisecond (ms).

In accordance with an embodiment of the present invention, there is provided a method for identifying multiple users for access to protected information, the method including:

using at least one biometric input device, generating a biometric user profile associated with a user to be authenticated; and/or using at least one behavioral input device, generating a behavioral user profile associated with the user to be authenticated;

storing the generated biometric user profile and/or the behavioral user profile in a database;

when authenticating an unknown user, obtaining from the unknown user, using the biometric input device and/or the behavioral input device, a biometric user sample and a behavioral user sample;

at a biometric and/or behavioral server, comparing the biometric user sample and the behavioral user sample to the biometric user profile and to the behavioral user profile associated with the user, respectively;

enabling the unknown user to access the protected information or providing him with simulated information, respectively; and if the biometric user sample and/or the behavioral user sample match the biometric user profile and the biometric behavioral profile, respectively, detecting a single authenticated first user, and otherwise, detecting an additional unauthenticated second user.

In some embodiments, when detecting the additional unauthenticated second user, the enabling access includes enabling access to the additional second user only to simulated information, similar but different from the protected information to which a single authenticated first user would be given access, such as, a bank account statement. Accordingly, a fraudulent user is provided some access, and is unable to distinguish whether or not he was detected as an unauthenticated second user.

In some embodiments, the method further includes a step of carrying out a "StepUp Authentication" process.

In some embodiments, the "StepUp Authentication" process is a void step, doing nothing. Thus, when secure-uncritical access is requested by the unauthenticated additional second user, nothing is done other than setting a flag to indicate that there are multiple users associated with the account/user name, the flag being useable for subsequent steps of the method and/or stored in the user profiles.

In some embodiments, the "StepUp Authentication" process includes sending a "One time password" (OTP) or similar request to a first user's related mobile device, which request must be answered by the unknown user in a second step as an out of band authentication before enabling access to the unauthenticated second user. Thus a "Second factor" authentication is realized.

In some embodiments, the "StepUp Authentication" process includes using a user specific cryptographic key stored by the user in the past at the related mobile device, which user specific cryptographic key is used after an action of the unknown user in a second step as an out of band authentication process before enabling access. Thus a "Second factor" authentication with a high security level is realized.

In some embodiments, the "StepUp Authentication" process includes creating an infinity sequence of further user requests. Thus a human user will quit this process by himself at some stage, and separately check what is required for receiving the requested access. For example, the user may call a support hot-line to authenticate himself again.

In some embodiments, the "StepUp Authentication" process includes, at different authentication steps, at least one of:
transmitting an OTP token to a second device registered as related to the first user;
asking the unknown user at least one security question previously registered for deeper authentication cases by an authenticated legal multiple user;
asking additional private information about the authenticated legal multiple user, which only the legal multiple user would know, the additional private information may be stored previously or created by data mining.

Thus the method may be modified, step by step, depending on the necessary security level and taking into consideration worse answer loops given by the unknown user.

In some embodiments, the biometric user profile and/or the biometric user sample include at least one of a fingerprint, a facial image, and a voice recording. Thus characteristic features of human beings are obtainable by technical means.

In some embodiments, the behavioral user profile and the behavioral user sample include at least one of:
characteristics of tactile interaction with a touchpad;
orientation of a device including the behavioral input device, during use thereof by the user, as sensed by at least one of a gyroscope, a magnetometer and an accelerometer;
characteristics of tactile interaction with a fingerprint scanner;
at least one keystroke pattern;
at least one sequence of application use;
characteristics of times of use;
characteristics of locations of use; and
characteristics of network connectivity during use.

Thus user samples may be specific to a specific user, and may be specific to each user in different manner.

In some embodiments, generating the biometric user profile and/or the behavioral user profile are carried out using a fingerprint sensor functioning at the biometric input device and/or as the behavioral input device. Thus device depending routines are usable.

In some embodiments, the behavioral input device includes a fingerprint sensor, and generating the behavioral user profile and obtaining the behavioral user sample include:
acquiring from the fingerprint sensor a full image of a fingerprint of the user;
obtaining from the fingerprint sensor at least one other, at least partial, image of a fingerprint of the user;
using the full image and the at least one other image, determining at least one of:
a direction in which a finger of the user was swiped over the fingerprint sensor in a fingerprint swipe;
a center of gravity of the fingerprint swipe;
a speed of the fingerprint swipe;
a position of the fingerprint swipe relative to the fingerprint sensor; and
a pressure applied by the finger of the user when swiping over the fingerprint sensor; and
using the full image, at least one other image, and at least one of the direction, the center of gravity, the position, the speed, and the pressure, generating a fingerprint swiping profile of the user as at least one of the behavioral user profile and the behavioral user sample. In some embodiments, by combining two images generated by the fingerprint sensor, a user-specific trajectory may be obtained.

In some embodiments, the fingerprint sensor includes a touchpad, and determining additionally includes determining at least one of:
a pattern of finger swiping on the touchpad;
at least one gesture drawn on the touchpad;
electrical currents drawn by the fingerprint sensor; and
characteristics of user tapping on the touchpad.

By using a touchpad with an integrated fingerprint sensor the resulting finger-movement may be obtained directly.

In some embodiments, the behavioral user profile and/or the behavioral user sample additionally include at least two of:
an angular orientation of a device including the behavioral input device during use thereof;
a location of use of the device;
at least one network to which the device is connected during use thereof;
at least one keystroke pattern;
at least one sequence of applications used by the user on the device; and
characteristics of times of use of the device by the user.

Thus additional dimensions of user specific characteristics may be obtained.

In some embodiments, when detecting the additional unauthenticated second user, the method further includes:
carrying out a "StepUp Authentication" process which distinguishes if the user is either an unauthenticated second user or a fraudulent user fitting another profile; and setting at least one flag depending whether the detecting resulted in detection of a single authenticated first user, an additional unauthenticated second user, a fraudulent user and/or in general authentication failure.

In some embodiments, the storing includes previously storing all behavior data captured by the behavioral input device on the device and/or on a behavioral server, and the comparing includes comparing a received behavior sample with all stored behavior of the user, such that in a case in which both behaviors are identical, a replay attack is detected and the authentication fails, wherein the comparing is carried out using statistical techniques including at least one of checking whether the received behavior sample is differs only minimally from the stored behavior by allowing for noise and/or by compensating for timing jitters of 1 ms or less.

In accordance with another embodiment of the disclosed technology, there is provided a method, the method including:

using a fingerprint sensor and a behavioral input device, generating a biometric user profile and a behavioral user profile associated with a user to be authenticated;

storing the biometric user profile and the behavioral user profile in a database;

when authenticating an unknown user, obtaining from the unknown user, using the fingerprint sensor and/or the behavioral input device, a biometric user sample and a behavioral user sample;

via a communication module, functionally associated with the fingerprint sensor and/or the behavioral input device, transmitting the biometric user sample and the behavioral user sample to a biometric and behavioral server;

at the biometric and behavioral server, extracting from the database the biometric user profile and the behavioral user profile, and comparing the biometric user sample and the behavioral user sample to the biometric user profile and to the behavioral user profile associated with the user, respectively;

enabling the unknown user to access to protected information or providing him with simulated information, respectively; and if the biometric user sample and the behavioral user sample match the biometric user profile and the behavioral user profile, generating a numeric scale security classification based on a degree of correlation between the biometric user sample and the behavioral user sample to the biometric user profile and to the behavioral user profile associated with the user, wherein a higher security classification results in a higher security clearance;

assigning a security clearance based on the degree of the correlation, where a high correlation indicates that a single authenticated first user is detected, and a low correlation indicates that an unauthenticated additional second user is detected wherein generating the biometric user profile and biometric user sample includes at least one of a fingerprint, a facial image and a voice recording, wherein generating the behavioral user profile and obtaining the behavioral user sample include:

acquiring from the fingerprint sensor a full image of a fingerprint of the user;

obtaining from the fingerprint sensor at least one other, at least partial, image of a fingerprint of the user;

using the full image and the at least one other image, determining at least three of:

a direction in which a finger of the user was swiped over the fingerprint sensor in a fingerprint swipe;

a center of gravity of the fingerprint swipe;

a speed of the fingerprint swipe;

a position of the fingerprint swipe relative to the fingerprint sensor; and a pressure applied by the finger of the user when swiping over the fingerprint sensor;

in combination with:

an angular orientation of a device including the behavioral input device during use thereof;

a location of use of the device;

at least one network to which the device is connected during use thereof;

at least one sequence of applications used by the user on the device; and characteristics of times of use of the device by the user;

generating at least one of the behavioral user profile and the behavioral user sample;

if an additional unauthenticated second user is detected, executing a "StepUp Authentication" process; and enabling the user to access to protected information or providing him with simulated information, respectively.

In some embodiments, during the failed authenticating step, a "StepUp Authentication" process distinguishes if the user is either an unauthenticated second user or a fraudulent user fitting another profile. Thus further steps are able for separate treatment of unauthenticated second users and fraudulent users.

In some embodiments, during a successful authenticating step, an additional telephone number of the user is requested from the user and registered in a central database for rightful owners or first users. Thus, user-specific communication data is useable to more securely distinguish between different users. Additionally, further personal data is obtainable via a direct call to the user in the case that some problems occur which relate to the access requested by the user.

In some embodiments, when the user is not authenticated (the captured behavior does not match the profile of the user) the following action is processed:

send a security code to the unauthenticated second user;

ask the unauthenticated second user to enter the security code as the provided credentials; and if the security code was entered correctly, learn a captured behavior.

Thus a high level of a secure authentication is realized also in the case that the biometric and/or behavior user sample do not match correctly.

In some embodiments, the behavioral user sample and/or biometric user sample is stored in a temporary user profile of the biometric and behavioral server or of the device, optionally encrypted, and the user profile is flagged as a multiple user profile, wherein the multiple user profile stores a plurality of behavioral modalities of a first user and a legal multiple user during a corresponding plurality of user sessions, in a single user profile, and wherein the first user and the multiple user are different individuals. Thus the method enables creation of a spouse account.

In accordance with another embodiment of the disclosed technology, there is provided a computer device (for instance a desktop computer, web tablet, mobile smartphone) for identifying multiple users for access to protected information, the device including:

at least one biometric input device for obtaining biometric information from a user to be authenticated and/or at least one behavioral input device for obtaining behavioral information from the user to be authenticated;

a database; and a processor, functionally associated with the biometric input device, the behavioral input device, and the database, the processor:

obtaining from the biometric input device biometric information associated with the user and generating therefrom biometric user profile and/or obtaining from the behavioral input device behavioral information associated with the user and generating therefrom a behavioral user profile;

storing the generated biometric user profile and/or the behavioral user profile in the database;

at a time of desired authentication, comparing a biometric user sample obtained from the biometric input device, and/or a behavioral user sample obtained from the behavioral input device to the biometric user profile and the behavioral user profile, respectively;

enabling the user to access the protected information or providing him with simulated information, respectively; and if the biometric user sample and/or the behavioral user sample match the biometric user profile and/or the behavioral user profile, respectively, indicating that a single authenticated first user is detected, otherwise indicating that an unauthenticated additional second user is detected.

In some embodiments, the database is located in a network node remote to the processor, the device further including at least one communication module for communicating at least one of the biometric user profile and the behavioral user profile to the database and for receiving communications from remote network nodes. Thus a centralized structure of the devices connected is realized.

In some embodiments, the biometric input device includes at least one of:

a fingerprint scanner obtaining, as the biometric information, at least one image of a user's fingerprint;

an image capturing device obtaining, as the biometric information, at least one facial image of the user; and a voice recording device obtaining, as the biometric information, at least one voice sample of the user.

Thus specific features of human beings are obtainable.

In some embodiments, the behavioral input device includes at least one of:

a touchpad providing, as the behavioral information, information regarding use characteristics of tactile interaction therewith;

at least one of a gyroscope, a magnetometer and an accelerometer providing, as the behavioral information, information regarding orientation of the device during use thereof by the user;

a fingerprint scanner providing, as the behavioral information, information regarding tactile interaction therewith during a fingerprint swipe;

a keystroke sensor providing, as the behavioral information, information regarding at least one keystroke pattern;

a processor providing, as the behavioral information, information regarding at least one sequence of application use;

a clock providing, as the behavioral information, information regarding characteristic times of use of the device or of at least one software application running thereon;

a positioning device providing, as the behavioral information, information regarding characteristic locations of use of the device; and at least one network connection providing, as the behavioral information, information regarding characteristic network connectivity during use of the device.

Thus generally sensor hardware of smart computer devices are usable to obtain biometric and/or behavioral data.

In some embodiments, the biometric input device and the behavioral input device include a fingerprint sensor, the fingerprint sensor capturing a full image of the fingerprint of the user and at least one other, at least partial, image of the fingerprint of the user and providing the full image and the at least one other image to the processor; and the processor receiving the full image and the at least one other image and computing, as part of the behavioral information and based on comparison of the full image and the at least one other image, at least one of:

a direction in which a finger of the user was swiped over the fingerprint sensor in a fingerprint swipe; a center of gravity of the fingerprint swipe;

a speed of the fingerprint swipe;

a position of the fingerprint swipe relative to the fingerprint sensor; and a pressure applied by the finger of the user when swiping over the fingerprint sensor.

Thus the user specific own fingerprint is useable in a further way.

In some embodiments, the fingerprint sensor includes a touchpad providing to the processor, for generation of the behavioral user profile or the behavioral user sample, behavioral information including at least one of:

a pattern of finger swiping on the touchpad;

at least one gesture drawn on the touchpad;

electrical currents drawn by the fingerprint sensor; and characteristics of user tapping on the touchpad.

Thus any movement of the finger is displayable directly.

In some embodiments, the behavioral input device additionally includes at least two of:

an orientation measuring device, such that the behavioral information includes an angular orientation of a device including the behavioral input device during use thereof;

a location sensor such that the behavioral information includes a position of the device during user thereof;

a network connectivity module such that the behavioral information includes identification of at least one network to which the device is connected during use thereof;

the processor, such that the behavioral information includes at least one of information relating to at least one keystroke pattern and at least one sequence of applications used by the user on the device; and a clock, such that the behavioral information includes characteristics of times of use of the device by the user.

Thus a more dimensional user profile is obtainable.

The novel features of the present invention are set forth in the appended claims. The invention itself, however, both its construction and its mode of operation, together with additional advantages and objects thereof, will be best understood from the following detailed description when read with reference to the accompanying drawings.

A better understanding of the disclosed technology will be obtained from the following detailed description of the preferred embodiments taken in conjunction with the drawings and the attached claims.

DETAILED DESCRIPTION

Embodiments of the disclosed invention are directed to methods and/or systems for using biometric and behavioral authentication for identifying one or more specific users using computing devices as intended users, thereby tying the computing devices to the users. The methods and/or systems may employ a fingerprint sensor, a behavior monitor or behavior capturing software, secure communication, and/or a biometric/behavioral server used to authenticate users. The biometric monitor and behavior monitor or behavior capturing software may gather and/or interpret biometric and behavioral information. The biometric/behavioral server may be used to compare the captured information to stored user profiles and to generate authentication information based on the comparison. The authentication information may be used to unlock a private key which may be used to authenticate the user of the computing devices, in some embodiments by the biometric/behavioral server.

Embodiments of the disclosed invention will become clearer in view of the following description of the Figures.

Figure 1:
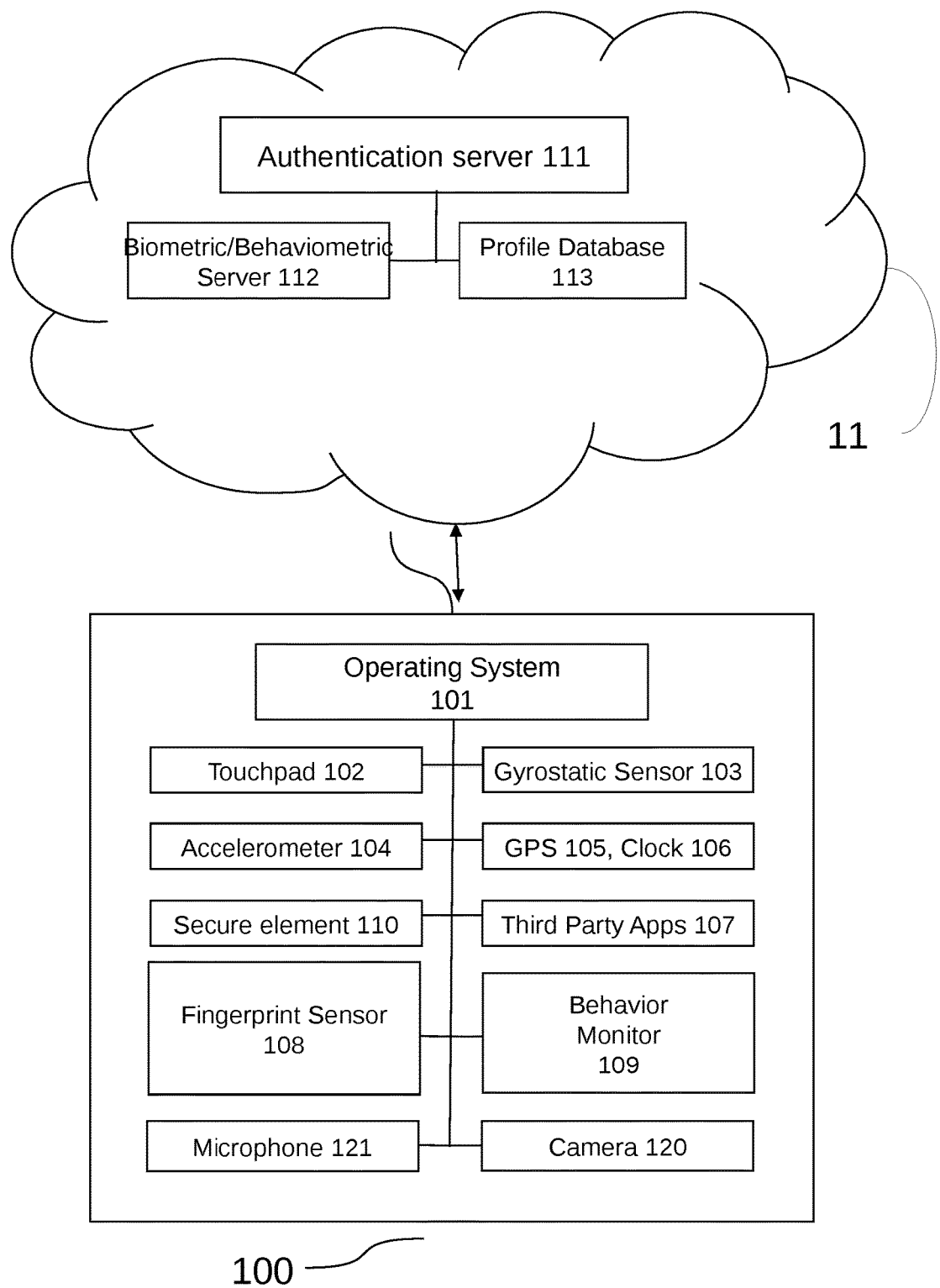
FIG. 1 shows a schematic overview of an exemplary system of an embodiment of the disclosed technology including a central biometric/behavioral server as well as an authentication server.
Figure 2:
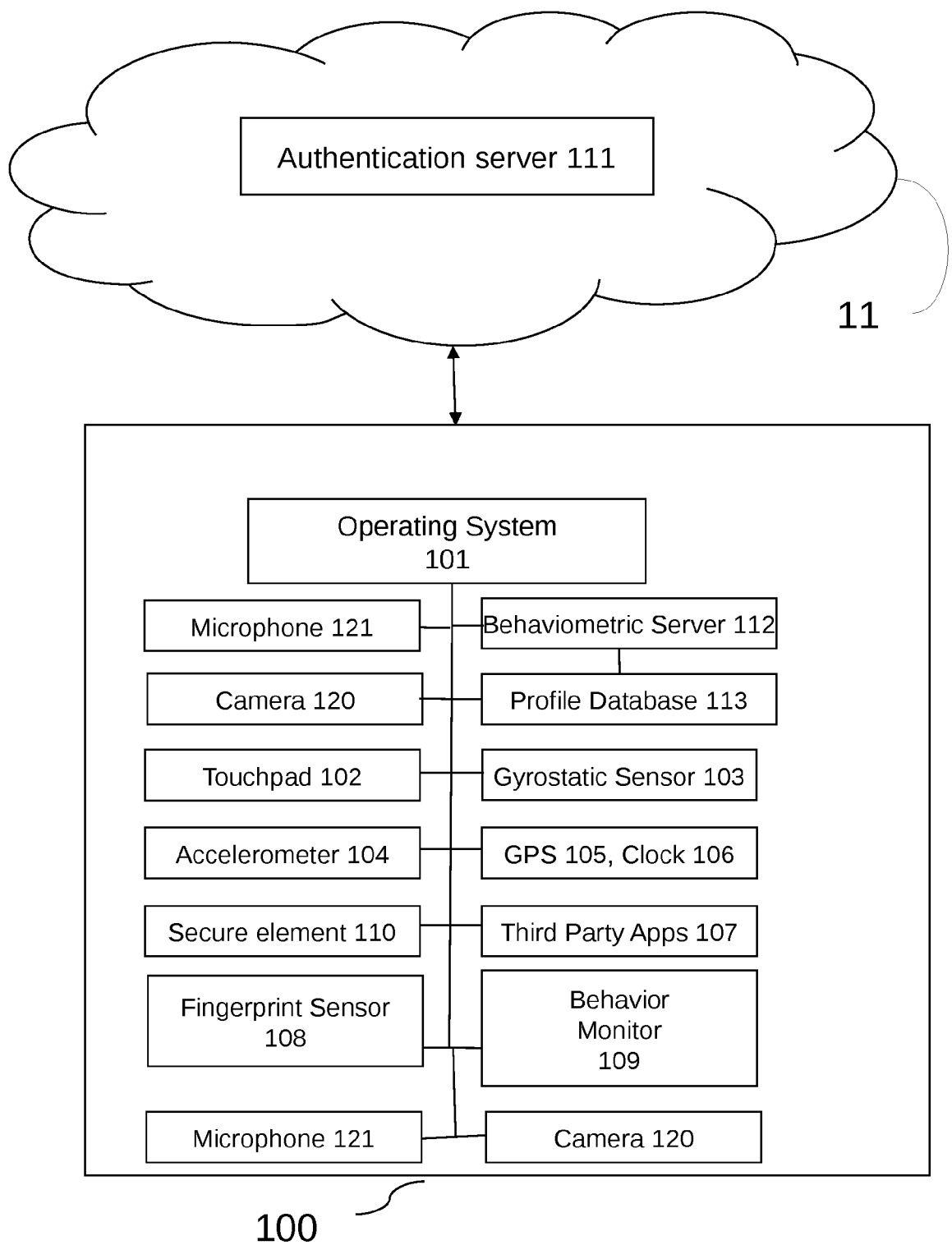
FIG. 2 shows a schematic overview of an exemplary system of an embodiment of the disclosed technology using only an authentication server.

FIG. 1 shows a schematic overview of an exemplary system of an embodiment of the disclosed technology including a central biometric/behavioral server as well as an authentication server. FIG. 2 shows a schematic overview of an exemplary system of an embodiment of the disclosed technology using only an authentication server.

The systems of FIGS. 1 and 2 are used to identify specific users intended to use a specific computing device. The systems include a computing device 100, having connection to at least one wireless packet-switched network 11, as well as one or more sensors as described hereinbelow. The computing device 100 may be a mobile computing device, defined as any portable electronic device with a processor that carries out instructions, and having at least one wireless packet-switched network connection, an input for user interaction, and a visible display with which a user may interact. Examples of mobile devices 100 may be, but are not limited to, mobile phones, tablets, personal digital assistants (PDAs), laptops, netbooks, smart watches, e-readers, and/or digital cameras. The computing device 100 may be a desktop computer, defined as any traditional stationary or portable electronic device with a processor that carries out instructions, and having at least a network connection, an input for user interaction, and a visible display with which a user may interact.

The system ties a user to a specific device 100 by binding user authentication to the device 100. Biometric and Behavioral input data of a user is gathered while the user is using the device 100. The data may be used to decrypt a private key located in a secure element 110, which secure element is associated with the device 100. The private key can then be used to sign transactions for authentication purposes.

Referring still to FIG. 1, the components of a mobile device 100 are shown. All of the components of the mobile device 100 are tied to an operating system 101, which is defined as coded instructions configured to instruct a hardware device to carry out mathematical operations or electrical interactions with physical components electrically or wirelessly connected to one another, as well as user interaction therewith. Examples of operating systems may include iOS, Android, BlackBerry OS and Microsoft operating systems.

Physical components of device 100 include one or more of a touchpad 102, a gyroscope and magnetometer sensor 103, an accelerometer 104, a GPS 105, a fingerprint sensor or reader 108, a microphone 121, and a camera 120. Each of these physical components may typically already be found in most mobile computing devices 100.

When employed by the present invention, the physical components are used to detect and monitor movements or activities carried out by the user with respect to the device 100. Such movements may include, for example, an orientation and/or angle at which a user holds a mobile device 100 during operation thereof. For example, a particular user may typically hold the mobile device 100 at a horizontal, landscape orientation, with the display tilted at a 45 degree angle with respect to the ground. Such behavior, if consistently exhibited, may be stored and associated with a user profile pertaining to the particular user. As such, when similar behavior is recognized, the system will associate a present user of the device with the recognized behavioral pattern, and thus grant security clearance based thereon.

Other components of the mobile device 100, which may be monitored, include a clock 106 and/or third party applications 107. Times during which a particular user carries out particular functions may be indicative and dispositive that the particular user should be granted security clearance. For example, if a particular user opens a news application every morning around 7:30 AM, such behavior may be stored as part of the user's profile and may be considered a recognizable pattern indicative of the particular user of the device 100.

Additionally, fingerprint sensor or reader 108 may also be monitored for behavioral data. Any one or more of the pressure, the center of pressure, the position of the finger of the user, and the relative motion of the finger when using a fingerprint sensor 108 may be indicative and dispositive that the particular user should be granted security clearance. For example, if a particular user always applies significant pressure when using the fingerprint sensor 108, such behavior may be stored in the user's profile and may be a recognizable pattern indicative of the particular user of the device 100. As a further example, if a particular user always swipes his finger over fingerprint sensor 108 from the upper left to the lower right, such behavior may be stored in the user's profile and may be a recognizable pattern indicative of the particular user of the device 100. As a further example, if a particular user always holds his mobile device 100 with a 45 degree angle relative to the ground when swiping his finger over the fingerprint sensor 108, such behavior may be stored in the user's profile and may be a recognizable pattern indicative of the particular user of the device 100.

Additional components may be included in the device 100 for purposes of monitoring, recording, and/or sending behavioral data. One such component is a behavior monitor 109. The behavior monitor 109 may be incorporated into software that is installed onto the device 100. Alternatively, the behavior monitor 109 may be incorporated into the operating system 101. The behavior monitor 109 uses network connection 11 of the device 100 to send behavioral data to and receive behavioral data from a suitable server or remote location. The behavior monitor 109 may run in the background, and collect all available behavioral data.

The behavior of the user might be also gathered by including specific software into Third Party Applications 107 which allow gathering of information regarding user behavior.

In some embodiments, the behavior monitor 109 runs continuously, so that the system might provide a constant behavioral data feed. The behavior monitor 109 may use a secure element 110 for encryption, decryption, signing, and/or signature checking operations. The behavior monitor 109 is operable to use all available network capabilities of device 100 such as Global System for Mobile Communications (GSM), Bluetooth, Near Field Communication (NFC), etc., to send collected behavioral data to an authentication server 111, and is capable of receiving data from the authentication server 111. The behavioral data may be formatted using Extensible Markup Language (XML), JavaScript Object Notation (JSON) or other suitable structured data format. User information and optional reference information about the used cryptographic keys may also be formatted using XML, JSON or other suitable structured data format.

The behavior monitor 109 may also be in communication with a biometric/behavioral server 112, by which behavioral data may be analyzed and cross-referenced to a profile database 113. The profile database 113 may also be accessed remotely via network communication, and may contain personalized behavioral data for different users. The biometric/behavioral server 112 as well as the database 113 might reside on the device 100 as shown in FIG. 2, or might be accessed remotely as shown in FIG. 1.

The behavior monitor 109 is operable to interpret behavioral input by monitoring system events of the operating system 101. In order to be independent of user actions like installing software or deleting software, the behavior monitor 109 may be realized as a system service or included into the source code of the operating system 101.

The behavioral input data may be preprocessed locally by the behavior monitor 109, using appropriate filters and templates for particular behaviors. This may be carried out, for example, by decreasing the granularity of the available data sources such as the gyroscope and magnetometer sensor 103 and the accelerometer 104. User touches or pressure values might be filtered to better distinguish the user behavior. Furthermore statistical data about the behavior of the user may also be gathered while the user is using the device 100.

The behavioral input data may be filtered by omitting outlier data from the behavior, or by using statistical or weighted methods, to gather data better suited for further processing. The behavioral data that is analyzed may include touch gestures, keyboard actions (dwell, flight time), and movements of the device as determined based on data captured from the gyroscope and magnetometer sensor 103, the accelerometer 104, and GPS 105.

The secure element 110, which may be included on the device 100, may be used for confirming or rejecting an identity of a user. The secure element might be a simple Subscriber Identity Module (SIM) Universal Integrated Circuit Card (UICC), Trusted Platform Module (TPM), NFC module or another smart card or device that is capable of storing a secret key or a private/public key pair and is able to perform cryptographic operations therewith.

The secure element 110 might be included in the device 100 or may be otherwise connected to it, such that it may be accessible via an application installed on the device 100. Such a connection between the device 100 and the secure element 110 may be carried out using several wire-bound or wireless protocols, including, but not limited to, Universal Serial Bus (USB), Bluetooth, NFC, Radio-Frequency Identification (RFID) or other suitable protocols. The secure element 110 may also comprise a secured application capable of holding a secret or private/public key pair and able to carry out cryptographic operations therewith, a combination of an application with a protected storage, or an application using a cryptographic co-processor.

The secure element 110 may contain a symmetric key or an asymmetric key pair, and a server key. Cryptographic keys may be included in the secure element 110 at production time of the secure element. Cryptographic keys may be included via a bootstrap process and may later be updated using secure means. The cryptographic keys might also be generated in the secure element and authenticated, using traditional Public-Key Infrastructure (PKI) means like signed Public-Key Cryptography Standard #10 (PKCS10) and certificates.

Figure 3:
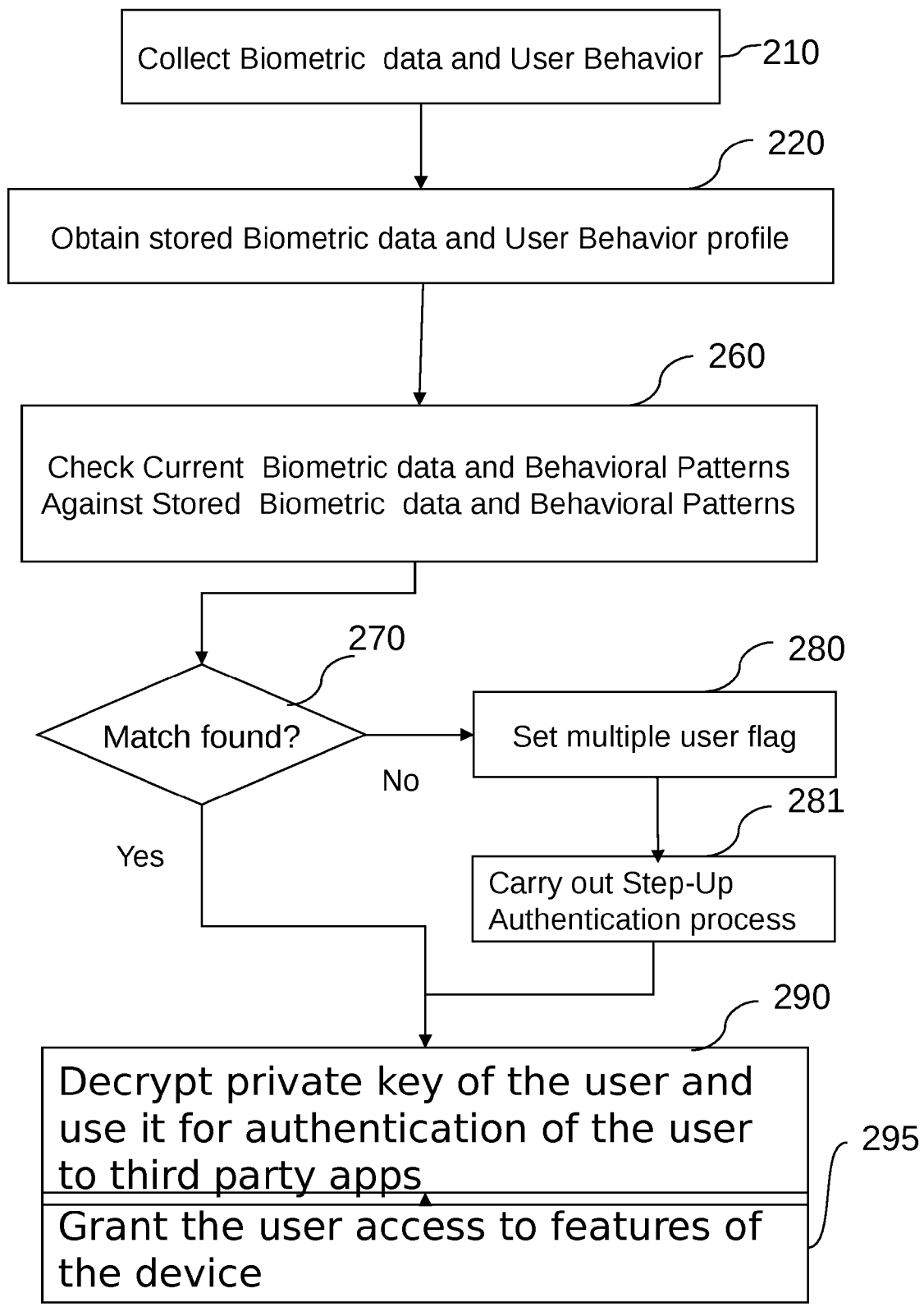
FIG. 3 shows a flow chart of steps taken in a method of authenticating a user according to an embodiment of the disclosed technology.

Reference is now made to FIG. 3, which shows a flow chart of steps taken in a method for identifying multiple users according to an embodiment of the disclosed technology. The steps of the method are described with respect to the device 100 and components thereof as illustrated in FIGS. 1 and 2, although any other suitable device may be used to carry out the method of FIG. 3.

In a first step 210 of the method, the behavior monitor or behavior input device gathers behavioral data via the device, and a biometric input device collects biometric data. The biometric and behavioral data may originate from the fingerprint sensor, the touchscreen or touchpad, the gyroscope sensor, the magnetometer, the accelerator, the microphone, the camera, the GPS location, or any other component of the device.

In a second step 220, stored biometric and behavioral patterns are drawn, as a user profile, from the database, based on provided user information. At step 260, the behavior monitor then checks the currently collected biometric data and behavioral patterns against previously stored biometric and behavioral patterns. If no match is found for the data at step 270 a multiple user flag is set in step 280 and a Step-up Authentication process is carried out at step 281. Alternatively, the granularity may be adjusted to encompass a broader range of behavioral attributes until a possible match is found.

Matching of the biometric and behavioral data to profiles in the database may be carried out using traditional statistic algorithms, using other available algorithms like Support Vector Machine (SVM) or Bayes nets, or using any other suitable algorithms. Thresholds for the similarity of the biometric and behavioral profiles and the provided biometric and behavioral information may be used to drive the matching decision.

If a match is found in step 270, at step 290 the private key of the user is decrypted and used for authentication against third parties. Such authentication may be carried out by signing some information or encrypting a token to generate authentication information, typically in the behavioral monitor. The required secure element keys or certificates may be generated either at the time of production of the secure element, or in an installation/updating phase of the secure element.

Using the authentication information, it is possible to grant access to specific features of the mobile device in step 295. The authentication information may be shared with third party applications on the device, which applications may require security clearance. Those applications requiring security clearance may be considered "protected services" for purposes of this specification. For example, a mobile banking application may require a certain level of security clearance before granting access to certain features thereof. The access granted in step 295 may otherwise be subject to other additional security measures, such as, for example, the entering of a PIN, the authentication of a fingerprint, or some other biometric security measure.

Once authentication is initially confirmed, a behavioral authenticated dialogue may be started with the protected service using the authentication information provided by the behavioral monitor. Behavior pertaining to the protected service may continue to be recorded and monitored after access is granted.

In another embodiment, which may be combined with any of the previous embodiments, the device may signal to the user that the user has been authenticated by the behavioral server. In still another embodiment, the behavioral server may transmit the user data and/or user information to a signature/encryption/token server together with additional authentication information pertaining to the user, such as a PIN, OTP token information, or other authentication information.

In yet another embodiment, when the user enters into a transaction with an application, the behavior of the user during the transaction is monitored and recorded, and a fingerprint of the user is recorded. The recorded data might be forwarded to the behavioral server to check if the recorded behavior matches an expected behavior of the user as well as for checking the fingerprint, as if the user had completed the transaction. In some cases, the behavior of provided by the user entering a transaction is classified differently from the behavior provided by the user browsing the Internet or entering a telephone number or PIN when creating a user profile.

In further embodiments, even minimal activity and patterns may be monitored. Such patterns may include keyboard timings, gestures, as well as Gesture User Interface (GUI) actions, and the like. As such, it may be possible to prevent so-called "replay attacks," whereby a behavior of a user is monitored and later "replayed." Such a "replay attack" may be difficult to carry out, given the extensive authentication measures required, and the accuracy of replay which would be required by the attacker.

In another embodiment, the behavioral monitor may run in a protected environment using a secure means to monitor and record behavioral information. The behavioral monitor might prompt a user with a specific keyboard on the display to securely enter a PIN and thereby collect behavioral data. Furthermore, the behavioral monitor might use any security means available on the specific device platform to prevent tampering.

In another embodiment, user information provided by the user might include a user name, a device Identity (ID), a token, a nonce, an ID of the secure element, an ID contained in the secure element, a PIN, an OTP token, and/or any combination thereof. In another embodiment, the provided user information might include transaction data or the hash of a transaction.

In still further embodiments, the decision of the biometric and behavioral server whether or not a biometric or behavior sample matches a corresponding user profile may be based on the quality and/or the amount of data stored in a particular profile. As such, a profile with relatively little data may be more easily authenticated. Additionally or alternatively, the decision of the biometric and behavioral server may be based on the quality and/or the amount of data recorded regarding a present user. Still further, the decision of the biometric and behavioral server may be based on the behavioral data provided by the user as well as on the requested service. For example, stricter matching requirements may be set for a service requiring high security, such as a banking service, than for a service requiring lower security, such as a game or entertainment service. Still further, the decision of the biometric and behavioral server may be based on the behavioral data provided by the user, and transaction data or the monetary value of the transaction. For example, the matching requirements may be stricter for a transaction having a monetary value greater than a predefined threshold, for example $100, $500, or $1000. The authentication information may contain parts of the supplied user information.

As mentioned above, if the biometric and behavioral server decides that the biometric and behavioral data supplied by the user does not match the biometric and behavioral profiles drawn from the database, a "Step-Up Authentication" process is initiated.

In some embodiments, in the "Step-up Authentication" process, a further authentication request may be sent to an operating system. As such, the operating system may generate an additional authentication request to the user. In some embodiments, the additional authentication request, is a secondary out of band authentication request, provided to the user via a different communication channel, such as e-mail, text message, or audio phone call.

In some embodiments, the operating system may call the user and ask for an additional authentication, such as fingerprints, a PIN number or a personal question known only to the user. The additional authentication information provided by the user may also be compared to a user profile stored in a database, and a decision may be made based on the comparison. In some embodiments, a call center may place a call to the user requesting authentication information such as a PIN or an answer to a security question. In some embodiments, the operating system may override a previous decision of the biometric and behavioral server rejecting authentication of the user.

In some embodiments, the secondary out of band authentication request includes requesting the user to transmit a one time password (OTP) token to a second device associated with the authenticated first user. In some embodiments, the secondary out of band authentication request includes asking the user at least one security question previously registered for deeper authentication cases by the authenticated first user. In some embodiments, the secondary out of band authentication request includes asking additional private information about the authenticated first user, which additional private information obtained by data mining.

In some embodiments, prior to and/or during the "Step-Up authentication" process, the user is enabled to access simulated information, similar to but different from the protected information to which an authorized or authenticated first user would be given access.

With regard to unlocking of the protected service, the authentication information may be transmitted directly to the protected service. Communication with the protected service may be carried out via the device, using a communicated token or nonce. The protected service may be stored on the device, on the secured element, or may be stored on the Internet and may be accessible via a Uniform Resource Locator (URL). The protected service may merely encompass a certain action or feature of a third party application, such as, for example, a transaction authentication request.

The behavioral and biometric server might be available as a central web service, such as server 112 of FIG. 1, or may be installed locally on the device, such as server 112 of FIG. 2.

Figure 4:
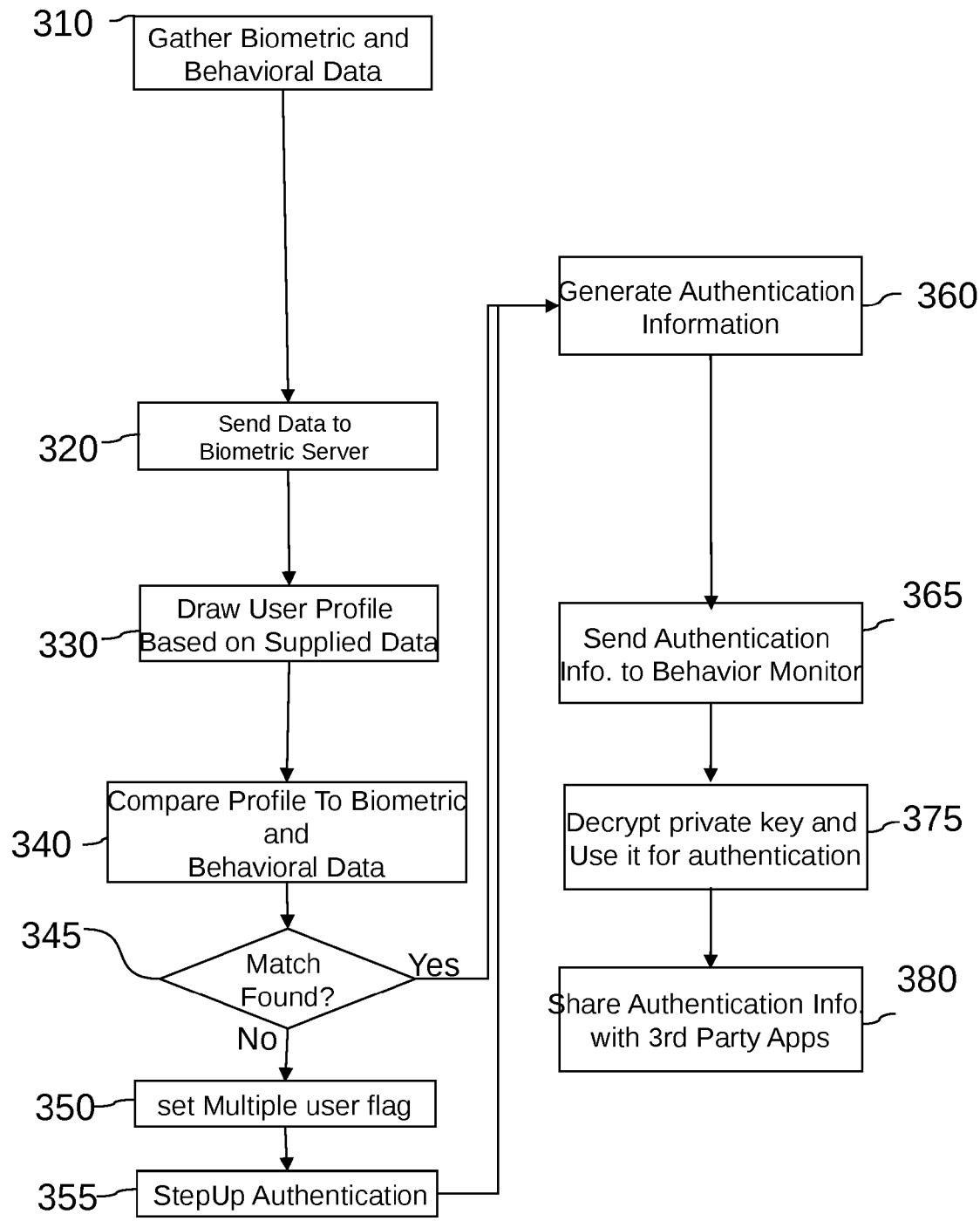
FIG. 4 shows a flow chart of steps taken in a method of authenticating a user according to another embodiment of the disclosed technology.

Reference is now made to FIG. 4, which shows a flow chart of steps taken in a method for identifying multiple users according to another embodiment of the disclosed technology. In a first step 310, behavioral and biometrical data are gathered from multiple on-board components of the computing device. The data may be gathered from use of a touchpad, an accelerometer, a GPS, a gyroscope sensor, a, magnetometer, a fingerprint sensor, and/or third party applications, substantially as described hereinabove with respect to FIGS. 1 and 2. The gathered behavioral data may be grouped by category, for example based on the source of the data, and then encrypted and optionally digitally signed, as seen at step 315. Additional data, such as data regarding the device, the user of the device, and the nature of the permission that is sought to be granted may also be encrypted.

Next, in step 320, the encrypted data is sent to the biometric and behavioral server. The data may be sent via the device's network connection, which may be via a local area network, a packet-switch data network, or any other type of connection. In step 330, a user profile is drawn from the database, for example based on the provided user data and/or device data. As discussed hereinabove, the biometric and behavioral server and the database may be remotely located (as shown in FIG. 1) or may be located on the device (as shown in FIG. 2).

Once the user profile is drawn, at step 340 the profile is compared to the behavioral data which was gathered in step 310. Next, in step 345, a determination is made as to whether the user profile matches the gathered biometric and behavioral data. If no match is found, then the server assumes that the user cannot be trusted or is not the intended user or owner of the device. Thus, in step 350 a multiple user flag is set and in step 355 the "Step-up Authentication" process is executed.

If, on the other hand, the user profile matches the biometric and behavioral data, authentication information is generated in step 360. The authentication information serves the purpose of communicating to the device that the user is, in fact, an authorized first user or a legal multiple user such as a spouce, respectively, or the intended user of the device, pursuant to the user's biometric and behavioral information matching that of the drawn user profile. The authentication information is then sent to the behavior monitor in step 365. Optional digital signing of the authentication information adds an extra level of security which indicates to the device that the data being sent is secure, thus allowing the authentication information to be checked by the device or third party applications and services.

In step 375, the authentication information is received by the behavior monitor of the device, and the private key of the user, which may be included in the authentication information, may be decrypted and used for generating additional authentication information. The authentication information may be shared with third party applications at step 380. The third party applications may use the authentication information shared therewith to grant security clearance to the user with regard to certain features and actions. For example, the authentication information may grant a user access to a mobile banking application on the mobile device, the user's behavior having been authenticated. In some cases, access is also subject to traditional security measures, such as the entering of a password or PIN number.

The authentication information may alternatively be in the form of a security classification of the current user. If the biometric and behavioral data only partially match the profile data, then some level of authentication may be granted. That is, certain features of the device and/or of third party applications may be accessible if those features do not require a high level of security. For example, a user with partial authentication may be permitted to access text messages on a mobile device, but would still be restricted from accessing critical information, such as a mobile banking application. The security classification may be based on a numeric scale, such as, for example, 1 to 10, 1 being lowest level of security clearance and 10 being the highest level of security clearance. The use of security classifications may be appropriate when the gathered behavioral data does not fully or exactly match the user profile data. Such may be the case when an intended user of a device is on vacation or is following a different personal schedule than normal.

Figure 5:
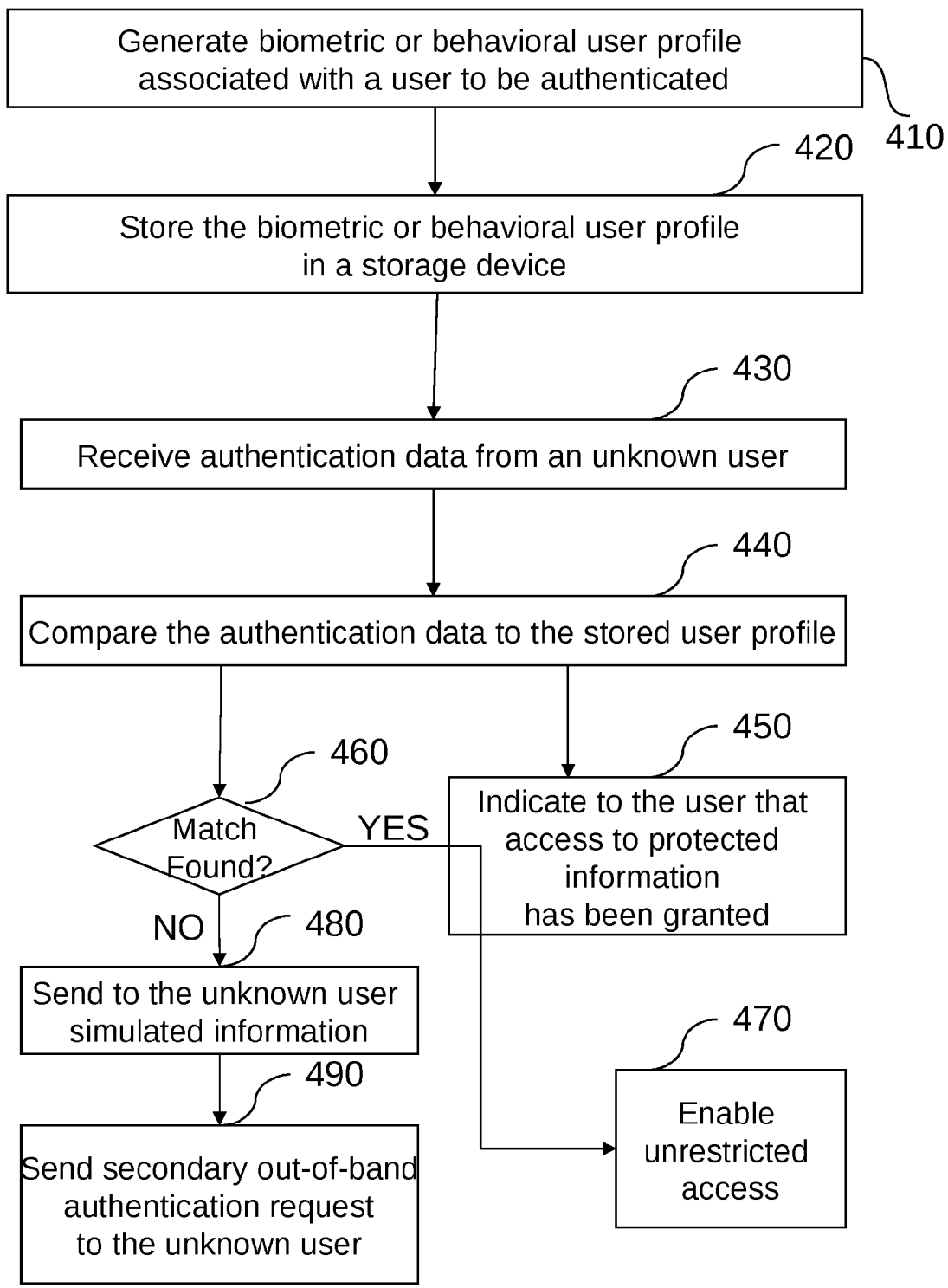
FIG. 5 shows a flow chart of steps taken in a method of authenticating a user according to another embodiment of the disclosed technology.

Reference is now made to FIG. 5, which shows a flow chart of steps taken in a method of authenticating a user according to another embodiment of the disclosed technology. As seen at step 410 of FIG. 5, a biometric or behavioral input device is used to generate a biometric or behavioral user profile associated with a first user to be authenticated. The user profile is generated based on user data collected using the biometric or behavioral input device.

At step 420, the generated biometric or behavioral user profile is stored in a storage device, such as a database. Subsequently, at step 430, authentication data is received from an unknown user, for example via the biometric or behavioral user profile. In this context, an unknown user is a user for whom it is unknown if the user is the first user or a second user.

At step 440, the received authentication data is compared to the biometric or behavioral user profile, so as to determine if the unknown user is the first user or a second user.

At step 450, regardless of the result of the comparison at step 440, an indication is transmitted to the unknown user, via a wired or wireless packet-switched network, indicating that access to protected information has been granted.

Additionally, if at step 460 it is determined that the comparison of step resulted a match, unrestricted access is enabled at step 470, and authentication information may be created and delivered to third party applications as described hereinabove. Otherwise, if in no match being found between the received authentication data and the user profile, at step 480 simulated information, similar to the protected information, is sent to the unknown user. In some embodiments, after providing the simulated information, at step 490 a secondary out of band authentication request is sent to the unknown user via a different communication channel, such as e-mail, text message, fingerprint authentication and/or an audio phone call. The secondary out of band authentication request may include one or more of:

requesting the unknown user to transmit a one time password (OTP) token to a second device associated with the authorized first user;

asking the unknown user at least one security question previously registered for deeper authentication cases by the authorized first user; and asking additional private information about the authorized first user, which additional private information are obtained by data mining.

Figure 6:
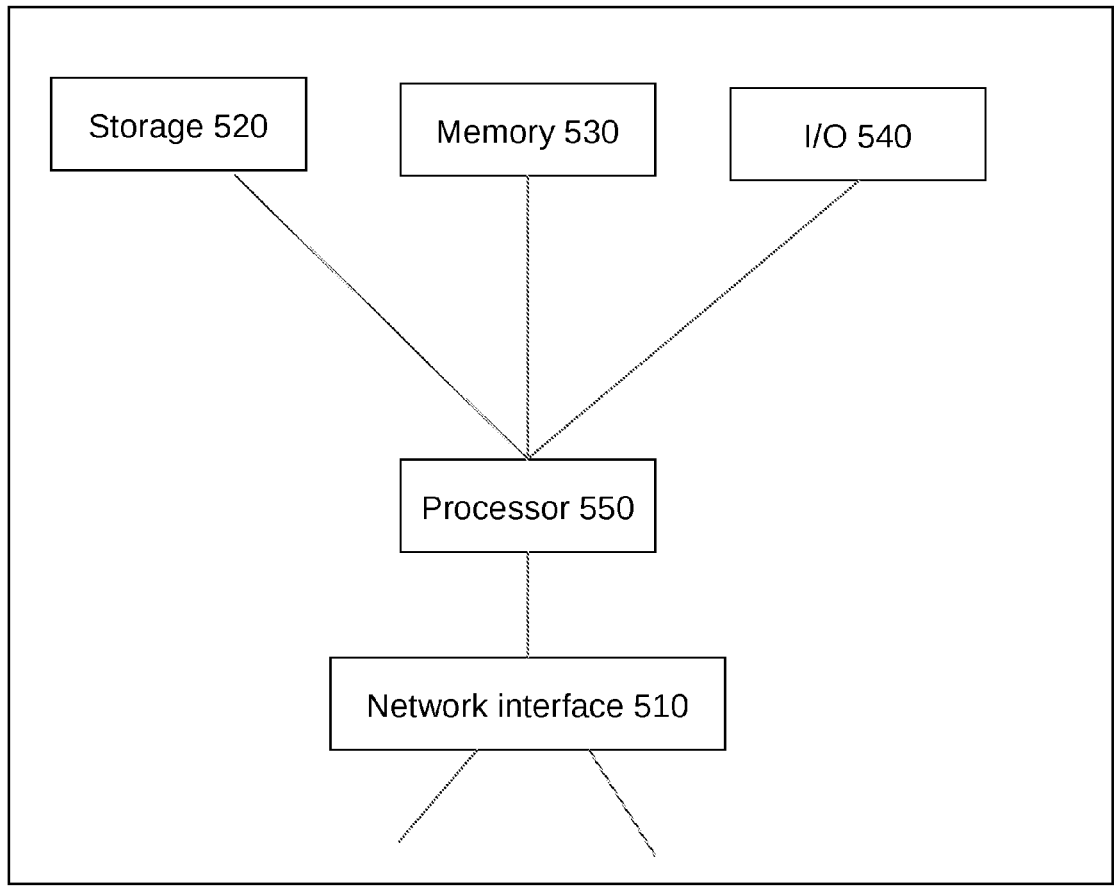
FIG. 6 shows a high level block diagram of a device that may be used to carry out the disclosed technology.

FIG. 6 shows a high-level block diagram of a mobile device that may be used to carry out the disclosed technology. Computing device 500 comprises a processor 550 that controls the overall operation of the device by executing the device's program instructions which define such operation. The device's program instructions may be stored in a storage device 520 (e.g., magnetic disk, database) and loaded into memory 530 when execution of the console's program instructions is desired. Thus, the device's operation will be defined by the device's program instructions stored in memory 530 and/or storage 520, and the console will be controlled by processor 550 executing the console's program instructions.

The device 500 also includes one or a plurality of input network interfaces for communicating with other devices via a network (e.g., packet-switched data network). The device 500 further includes an electrical input interface for receiving power and data from a power source. A device 500 also includes one or more output network interfaces 510 for communicating with other devices. Device 500 also includes input/output 540, representing devices which allow for user interaction with a computing device (e.g., touch display, keyboard, fingerprint reader etc.).

One skilled in the art will recognize that an implementation of an actual device will contain other components as well, and that FIG. 6 is a high level representation of some of the components of such a device for illustrative purposes. It should also be understood by one skilled in the art that the methods, systems and/or devices depicted in FIGS. 1 through 5 may be implemented on a device such as is shown in FIG. 6.

While the disclosed invention has been taught with specific reference to the above embodiments, a person having ordinary skill in the art will recognize that changes can be made in form and detail without departing from the spirit and the scope of the disclosed invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed invention.

The invention claimed is:

1. A method for granting access to an unauthorized user, comprising the steps of:

using a fingerprint reader, generating a biometric or behavioral user profile associated with a first user to be authenticated without knowledge of said biometric or behavioral user profile by said first user, by:
acquiring from said fingerprint reader a full image of a fingerprint of said first user;
obtaining from said fingerprint reader at least one other, at least partial, image of a fingerprint of said first user;
using said full image and said at least one other, at least partial, image of a fingerprint of said first user, determining at least one of:
a direction in which a finger of said first user was swiped over said fingerprint reader in a fingerprint swipe;
a center of gravity of said fingerprint swipe;
a speed of said fingerprint swipe;
a position of said fingerprint swipe relative to a fingerprint sensor of said fingerprint reader; and
a pressure applied by said finger of said first user when swiping over said fingerprint reader; and
using said full image, said at least one other, at least partial, image of a fingerprint of said first user, and at least one of said direction, said center of gravity of said fingerprint swipe, said position of said fingerprint swipe relative to said fingerprint sensor of said fingerprint reader, said speed of said fingerprint swipe, and said pressure applied by said finger of said first user when swiping using said fingerprint reader, generating a fingerprint swiping profile of said first user in said biometric or behavioral user profile;

storing said generated biometric or behavioral user profile in a storage device;

receiving, via said fingerprint reader, authentication data from an unknown user, wherein it is unknown if said unknown user is said first user or a second user;

comparing said authentication data to said biometric or behavioral user profile associated with said first user and determining if said unknown user is said first user or said second user based on a comparison of said at least of said direction, an amount a touch sensitive device is touched, said pressure of touch, and said speed of said fingerprint swipe as determined by said fingerprint reader; and transmitting to said unknown user, via a wired or wireless packet-switched network an indication that access to protected information associated with said first user has been granted;

wherein, when said unknown user is determined to be said second user, sending a fraud alert to said first user via a wired or wireless packet switched communication channel and providing to said second user other information which is information other than said protected information to said second user.

2. The method of claim 1, further comprising a step of, after providing said other information, sending a secondary out of band authentication request to said unknown user or to a second unauthenticated user via a different communication channel and different node on a network, said different communication channel including at least one of e-mail, text message, fingerprint authentication, or audio phone call.

3. The method of claim 2, wherein said secondary out of band authentication request comprises at least one of:
requesting said second user or said unknown user to transmit a One Time Password (OTP) token to a second device associated with said first user;
asking said second user at least one security question previously registered for secondary authentication by said first user;
asking additional private information about said first user, said additional private information obtained by data mining.

4. The method of claim 1, wherein said biometric or behavioral user profile comprises a fingerprint and at least one of:
characteristics of tactile interaction with a touchpad;
orientation of a device including said, during use thereof by said first user, as sensed by at least one of a gyroscope, a magnetometer and an accelerometer;
characteristics of tactile interaction with a said fingerprint reader;

at least one keystroke pattern;
at least one sequence of application use;
characteristics of times of use;
characteristics of locations of use; and
characteristics of network connectivity during use.

5. The method of claim 1, wherein:
said fingerprint reader comprises a touchpad, and said determining additionally comprises determining at least one of:
a pattern of finger swiping on said touchpad;
at least one gesture drawn on said touchpad;
electrical currents drawn by said fingerprint reader; and
characteristics of user tapping on said touchpad; and/or
wherein said biometric or behavioral user profile additionally comprises at least two of:
an angular orientation of a device including said fingerprint reader during use thereof by said first user;
a location of use of said device;
at least one network to which said device is connected during use thereof by said first user;
at least one keystroke pattern;
at least one sequence of applications used by said first user on said device; and
characteristics of times of use of said device by said user.

6. The method of claim 1, wherein when said unknown user is determined to be said second user, said method further comprising, as a direct result of that said unknown user is determined to be said second user, sending a fraud alert to said first user via a wired or wireless packet-switched communication channel.

7. The method of claim 1, further comprising:
capturing biometric or behavioral data for all users using said fingerprint reader, at least some of said biometric or behavioral data for each specific user of said users being captured without the specific user being aware of said capturing;
storing said captured biometric or behavioral data on said storage device; and
upon receipt of new data from another user, comparing said new data with all said stored captured biometric and behavioral data and determining whether said another user is the same as said second user,
wherein said determining is carried out after one of adjusting for noise in said stored captured biometric and behavioral data, and adjusting for timing jitters of less than 1 millisecond (ms).

8. A method for identifying multiple users for access to protected information, the method comprising:
using at least one hardware biometric input device, generating a biometric user profile associated with a user to be authenticated, said biometric user profile being based at least partially on biometric data collected by said biometric input device without the user being aware of collection of said biometric data including collection of one or more of swipe speed, swipe pressure, and area of a screen touched,
and/or using at least one at least one hardware behavioral input device, generating a behavioral user profile associated with said user to be authenticated, said behavioral user profile being based at least partially on behavioral data collected by said behavioral input device without the user being aware of collection of said behavioral data,
wherein at least one of said generating said biometric user profile and said generating said behavioral user profile is carried out using a fingerprint sensor functioning as said biometric input device and/or as said behavioral input device;
storing said generated biometric user profile and/or said behavioral user profile in a database;
when authenticating an unknown user, obtaining from said unknown user, using said at least one biometric input device and/or said at least one behavioral input device, a biometric user sample and a behavioral user sample;
at a biometric and/or behavioral server, comparing said biometric user sample and said behavioral user sample to said biometric user profile and to said behavioral user profile associated with said user to be authenticated, respectively;
enabling said unknown user to access said protected information; and
if said biometric user sample and/or said behavioral user sample matches said biometric user profile and said biometric behavioral profile, respectively, detecting a single authenticated first user, and otherwise, detecting an additional unauthenticated second user,
wherein at least one of said generating said behavioral user profile and said obtaining said behavioral user sample comprises:
acquiring from said fingerprint sensor a full image of said fingerprint of said user;
obtaining from said fingerprint sensor at least one other, at least partial, image of said fingerprint of said user;
using said full image and said at least one other, at least partial image of said fingerprint of said user, determining at least one of:
a direction in which a finger of said user was swiped over said fingerprint sensor in a fingerprint swipe;
a center of gravity of said fingerprint swipe;
a speed of said fingerprint swipe;
a position of said fingerprint swipe relative to said fingerprint sensor; and
a pressure applied by said finger of said user when swiping over said fingerprint sensor; and
using said full image, at least one other image, at least partial image of said fingerprint of said user, and at least one of said direction, said center of gravity of said fingerprint swipe, said position of said fingerprint swipe relative to said fingerprint sensor, said speed of said fingerprint swipe, and said pressure applied by said finger of said user when swiping over said fingerprint sensor, generating a fingerprint swiping profile of said user as at least one of said behavioral user profile and said behavioral user sample.

9. The method of claim 8, wherein, when detecting said additional unauthenticated second user, said enabling access includes enabling access to said additional unauthenticated second user only to simulated information which is different from said protected information to which a single authenticated first user would be given access.

10. The method of claim 8, further comprising a step of carrying out a "StepUp Authentication" process, said "StepUp authentication" process being one of:
a void step, doing nothing;
sending a "One Time Password" (OTP) request to a user related mobile device, which request must be answered by said unknown user in a second step as an out of band authentication process, before said enabling access;
using a user specific cryptographic key stored by said user in the past at said user related mobile device, which user specific cryptographic key is used after an action of said unknown user in a second step as an out of band authentication process before said enabling access; and creating an infinity sequence of further user requests.

11. The method of claim 10, wherein said "StepUp Authentication" process includes, at different authentication steps, at least one of:
transmitting an OTP token to a second device registered as related to said first user;
asking said unknown user at least one security question previously registered for secondary authentication by an authenticated legal multiple user;
asking additional private information about said authenticated legal multiple user, which only the legal multiple user would know, said additional private information may be stored previously or created by data mining.

12. The method of claim 8, wherein:
said biometric user profile and said biometric user sample comprise a fingerprint; and
said behvioral user profile and said behavioral user sample comprise at least one of:
characteristics of tactile interaction with a touchpad;
orientation of a device including said behavioral input device, during use thereof by said user, as sensed by at least one of a gyroscope, a magnetometer and an accelerometer;
characteristics of tactile interaction with said fingerprint sensor;
at least one keystroke pattern;
at least one sequence of application use;
characteristics of times of use;
characteristics of locations of use; and
characteristics of network connectivity during use.

13. The method of claim 8, wherein said fingerprint sensor comprises a touchpad, and said determining additionally comprises determining at least one of:
a pattern of finger swiping on said touchpad;
at least one gesture drawn on said touchpad;
electrical currents drawn by said fingerprint sensor; and
characteristics of user tapping on said touchpad;
and/or wherein at least one of said behavioral user profile and said behavioral user sample additionally comprises at least two of:
an angular orientation of a device including said behavioral input device during use thereof;
a location of use of said device;
at least one network to which said device is connected during user thereof;
at least one keystroke pattern;
at least one sequence of applications used by said user on said device; and
characteristics of times of use of said device by said user.

14. The method of claim 8, wherein, when detecting said additional unauthenticated second user, said method further comprises:
carrying out a "StepUp Authentication" process which distinguishes if said user is either an unauthenticated second user or a fraudulent user fitting another profile; and
setting at least one flag depending whether said detecting resulted in detection of a said single authenticated first user, a said additional unauthenticated second user, a said fraudulent user and/or in general authentication failure.

15. The method of claim 8, wherein:
said storing comprises previously storing all behavior data captured by said behavioral input device on said device and/or on a behavioral server;
said comparing includes comparing a received behavior sample with all stored behavior of said user, wherein in a case in which both behaviors are identical, a replay attack is detected and the authentication fails,
wherein said comparing is carried out using statistical techniques including at least one of checking whether the received behavior sample is differs only minimally from the stored behavior by allowing for noise and/or by compensating for timing jitters of 1 ms or less.

16. A computer device for identifying multiple users for access to protected information, the computer device comprising:
a fingerprint reader for obtaining at least one of biometric information from a user to be authenticated and/or behavioral information from said user to be authenticated;
a database; and
a processor, functionally associated with said fingerprint reader and said database, said processor:
obtaining from said fingerprint reader biometric information associated with said user and generating therefrom a biometric user profile and/or obtaining from said fingerprint reader behavioral information associated with said user and generating therefrom a behavioral user profile, at least part of said biometric information associated with said user and/or of said behavioral information associated with said user being collected without the user being aware of collection of said biometric information and/or behavioral information,
wherein said generating said biometric user profile and/or said generating said behavioral user profile is carried out by said processor by:
acquiring from said fingerprint reader a full image of a fingerprint of said first user;
obtaining from said fingerprint reader at least one other, at least partial, image of a fingerprint of said first user;
using said full image and said at least one other, at least partial, image of a fingerprint of said first user, determining at least one of:
a direction in which a finger of said first user was swiped over said fingerprint reader in a fingerprint swipe;
a center of gravity of said fingerprint swipe;
a speed of said fingerprint swipe;
a position of said fingerprint swipe relative to a fingerprint sensor of said fingerprint reader; and
a pressure applied by said finger of said first user when swiping over said fingerprint reader; and
using said full image, said at least one other, at least partial, image of a fingerprint of said first user, and at least one of said direction, said center of gravity of said fingerprint swipe, said position of said fingerprint swipe relative to said fingerprint sensor of said fingerprint reader, said speed of said fingerprint swipe, and said pressure applied by said finger of said first user when swiping using said fingerprint reader, generating a fingerprint swiping profile of said first user in said biometric or behavioral user profile;
storing said generated biometric user profile and/or said behavioral user profile in said database;

at a time of desired authentication, comparing a biometric user sample obtained from said fingerprint reader, and/or a behavioral user sample obtained from said fingerprint reader with said biometric user profile and said behavioral user profile, respectively;

enabling said user to access said protected information or providing him with simulated information respectively;

and if said biometric user sample and/or said behavioral user sample match said biometric user profile and/or said biometric behavioral profile, respectively, indicating that a single authenticated first user is detected, otherwise indicating that an unauthenticated additional second user is detected.

17. The device of claim 16, further comprising at least one behavioral input device comprising at least one of:
   a touchpad providing, as said behavioral information, information regarding user characteristics of tactile interaction therewith;
   at least one of a gyroscope, a magnetometer and an accelerometer providing, as said behavioral information, information regarding orientation of said device during use thereof by said user;
   said fingerprint reader providing, as said behavioral information, information regarding tactile interaction therewith during a fingerprint swipe;
   a keystroke sensor providing, as said behavioral information, information regarding at least one keystroke pattern;
   a processor providing, as said behavioral information, information regarding at least one sequence of applications used;
   a clock providing, as said behavioral information, information regarding characteristic times of use of said device or of at least one software application running thereon;
   a positioning device providing, as said behavioral information, information regarding characteristic locations of use of said device; and
   at least one network connection providing, as said behavioral information, information regarding characteristic network connectivity during use of said device; and
   wherein said behavioral input device additionally includes at least two of:
   an orientation measuring device, such that said behavioral information comprises an angular orientation of said device during use thereof;
   a location sensor such that said behavioral information comprises a position of said device during use thereof;
   a network connectivity module such that said behavioral information comprises identification of at least one network to which said device is connected during use thereof;
   said processor, wherein said behavioral information comprises at least one of information relating to at least one keystroke pattern and at least one sequence of applications used by said user on said device; and
   a clock, such that said behavioral information comprises characteristics of times of use of said device by said user.

18. The method of claim 1, wherein said using said full image and said at least one other, at least partial image of a fingerprint of said user, determining at least one of said direction, said center of gravity, said speed, said position, and said pressure comprises using said full image and said at least one other, at least partial image of said fingerprint of said user, determining at least two of said direction, said center of gravity, said speed, said position, and said pressure, and Wherein said generating said fingerprint swiping profile is carried out using said full image, at least one other image, at least partial image of a fingerprint of said user, and said at least two of said direction, said center of gravity of said fingerprint swipe, said position of said fingerprint swipe relative to said fingerprint sensor, said speed of said fingerprint swipe, and said pressure applied by said finger of said user when swiping over said fingerprint sensor.

19. The method of claim 8, wherein said using said full image and said at least one other, at least partial image of a fingerprint of said user, determining at least one of said direction, said center of gravity, said speed, said position, and said pressure comprises using said full image and said at least one other, at least partial image of said fingerprint of said user, determining at least two of said direction, said center of gravity, said speed, said position, and said pressure, and wherein said generating said fingerprint swiping profile is carried out using said full image, at least one other image, at least partial image of a fingerprint of said user, and said at least two of said direction, said center of gravity of said fingerprint swipe, said position of said fingerprint swipe relative to said fingerprint sensor, said speed of said fingerprint swipe, and said pressure applied by said finger of said user when swiping over said fingerprint sensor.

20. The device of claim 16, wherein said using said full image and said at least one other, at least partial image of a fingerprint of said user, determining at least one of said direction, said center of gravity, said speed, said position, and said pressure comprises using said full image and said at least one other, at least partial image of said fingerprint of said user, determining at least two of said direction, said center of gravity, said speed, said position, and said pressure, and wherein said generating said fingerprint swiping profile is carried out using said full image, at least one other image, at least partial image of a fingerprint of said user, and said at least two of said direction, said center of gravity of said fingerprint swipe, said position of said fingerprint swipe relative to said fingerprint sensor, said speed of said fingerprint swipe, and said pressure applied by said finger of said user when swiping over said fingerprint sensor.

* * * * *